United States Patent [19]

Hsu

[11] Patent Number: 5,894,515
[45] Date of Patent: Apr. 13, 1999

[54] RANDOM ACCESS MEMORY DEVICE HAVING INCONSISTENT WRITE-IN AND READ-OUT DATA

[75] Inventor: Jerry Hsu, Yun-Lin Shan, Taiwan

[73] Assignee: United Microelectronics Corporation, Hsinchu, Taiwan

[21] Appl. No.: 08/514,646

[22] Filed: Aug. 14, 1995

[51] Int. Cl.⁶ .................................................. H04L 9/00
[52] U.S. Cl. ........................................ 380/4; 380/50
[58] Field of Search ............................ 380/4, 20, 23, 380/25, 24, 50

[56] References Cited

U.S. PATENT DOCUMENTS

| | | | |
|---|---|---|---|
| 4,465,901 | 8/1984 | Best | 380/4 |
| 4,573,119 | 2/1986 | Westheimer et al. | 364/200 |
| 4,698,617 | 10/1987 | Baur | 380/4 |
| 4,764,959 | 8/1988 | Watanabe et al. | 380/4 |
| 4,797,928 | 1/1989 | Dykes | 380/49 |
| 4,896,301 | 1/1990 | Ogawa | 365/230.03 |
| 5,131,091 | 7/1992 | Mizuta | 395/725 |
| 5,155,829 | 10/1992 | Koo | 395/425 |
| 5,343,525 | 8/1994 | Hung et al. | 380/4 |
| 5,379,433 | 1/1995 | Yamagishi | 395/725 |
| 5,471,045 | 11/1995 | Geronimi | 235/492 |
| 5,533,125 | 7/1996 | Bensimon et al. | 380/4 |
| 5,754,647 | 5/1998 | Hsu | 380/4 |

*Primary Examiner*—Gail O. Hayes
*Assistant Examiner*—Hrayr A. Sayadian
*Attorney, Agent, or Firm*—Tung & Associates

[57] ABSTRACT

A random access memory device having nonconforming write-in and read-out data is provided, and includes three major components: a random access memory (RAM) core, a control logic circuit, and a transfer device. The control logic circuit is responsive to a read/write signal, and a chip select signal for generating a write path enable signal, and read path enable signal. The transfer device is separated into a write path and a read path. The write path includes a write-transfer device and a tri-state buffer coupled in series. A data bus external to the memory device provides an input to the write path for write-in data, while the output of the write path is coupled to the RAM core input data. The read path includes a read transfer device coupled in series with a second tri-state buffer. The core output data from the RAM core is coupled to the read path as an input, while the output of the read path is coupled to the data bus external to the memory device. The read path and write path enable signals appropriately enable the read path and the write path for operation. The write-transfer device, and the read-transfer device operate in a noncomplementary fashion such that write-in data passing through the write-transfer device, and subsequently through the read-transfer device, is not restored to its original form, thus providing computer data protection.

14 Claims, 2 Drawing Sheets

RANDOM ACCESS MEMORY DEVICE HAVING INCONSISTENT WRITE-IN AND READ-OUT DATA

BACKGROUND OF THE INVENTION

1. Field of the Invention

The present invention relates generally to memory devices, and, more particularly, relates to a random access memory device having inconsistent write-in and read-out data.

2. Description of the Background Art

Techniques for protecting computer data from unauthorized access and/or copying have been under investigation for some time. In particular, in present day technology for protecting computer data, a necessary step involves the task of encrypting the data such that it cannot be recognized by an unauthorized user. For an authorized user to recognize such data in its original form, a corresponding decryption process must be applied to the encrypted data. The restored data may then be used in normal computer operations. Computer data protection techniques of the type utilizing encryption/decryption methods are carried out, generally, by execution of specific computer software. In particular, the computer data is calculated by a specific computer microprocessor. Accordingly, such computer software may not be easily portable to other microprocessors. Further, such methodology is easily defeated. That is, in such a method that is implemented solely by execution of computer software, it is fairly easy for an unauthorized user to use the computer data to break the encryption method wherein access to the original computer data may be had.

In a conventional random access memory (RAM) device, the write-in data, and the read-out data are always the same.

Accordingly, there is a need to provide an improved RAM device that minimizes or eliminates one or more of the prior of the problems as set forth above.

SUMMARY OF THE INVENTION

In accordance with the present invention, a memory device for storing write-in data and retrieving corresponding read-out data wherein the read-out data does not conform to the write-in data is provided. A memory device in accordance with the present invention includes a control circuit, a memory means, and a transfer circuit. The control circuit is responsive to a read signal and a write signal for generating at least one enable signal. The memory means includes an input and an output for storing input data on the input according to the write signal, and for outputting output data on the output accordingly to the read signal, wherein the output data conforms to or is the same as the corresponding input data. In other words, a conventional memory means is used. Finally, the transfer circuit is responsive to the write-in data to the device for generating data delivered as the input data. The transfer circuit is further responsive to the output data from the memory means for generating the read-out data of the memory device. The transfer circuit is responsive to the enable signal for causing nonconformance between the write-in data and the read-out data. A memory device in accordance with the present invention is particularly suitable for use in a software protection apparatus.

In a preferred embodiment, the memory means and the transfer circuit are fabricated onto one integrated circuit. A memory device in accordance with the present invention further includes a write path for storing write-in data and a read path for retrieving corresponding read-out data. The transfer circuit includes a write-transfer device and a read-transfer device. The control circuit is operative to generate a pair of complementary enable signals: a read path enable signal, and a write path enable signal for respectively activating the write-transfer device through the write path, or the read-transfer device through the read path. Since only the write-in data, or the read-out data are modified, the transfer circuit is effective to establish nonconformance between the write-in and the read-out data. In practical application, additional transfer software is needed to obtain the original computer data for normal operation of the system. Through the match-up of software and hardware, the data protection process is greatly improved.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
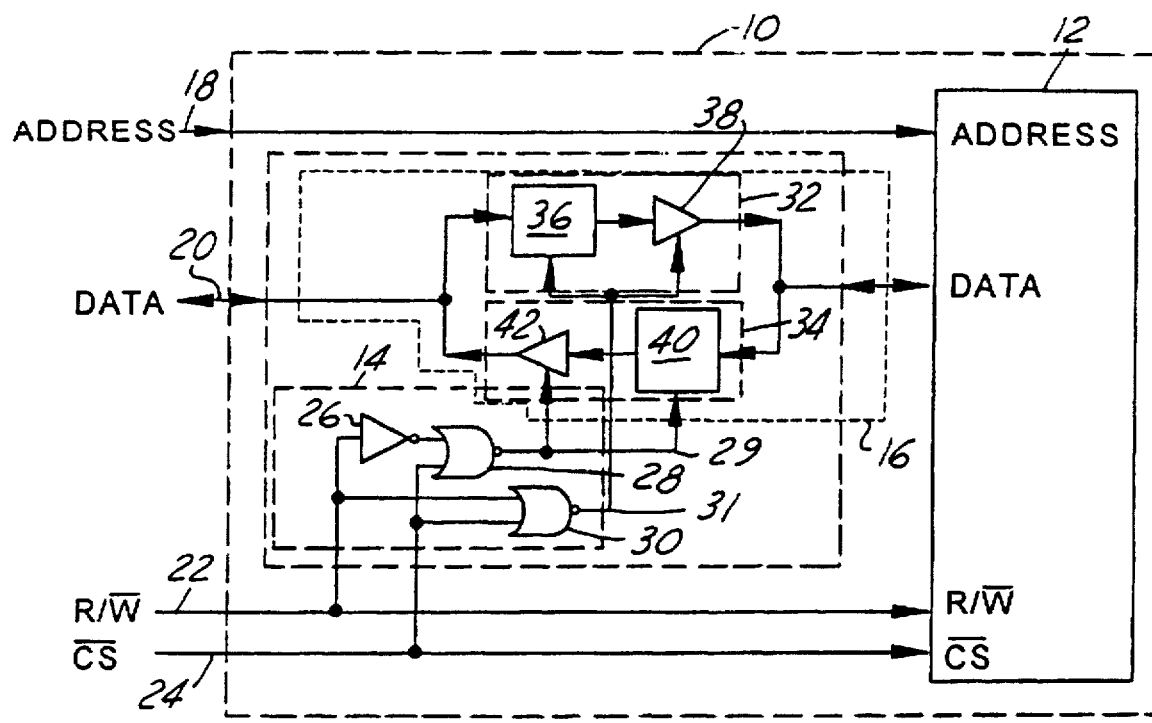
FIG. 1 is a simplified schematic and block diagram view illustrating a first embodiment in accordance with the present invention.

FIG. 1 shows a random access memory (RAM) device 10 in accordance with the present invention. Device 10 preferably includes a random access memory (RAM) core 12, a control logic circuit 14, and a means, such as transfer circuit or device 16, for causing nonconformance between write-in data and read-out data of device 10. Device 10 is suitably adapted for use in computer protection systems and, in practical use, requires no modification in the external circuitry for direct application. Device 10 may be addressed randomly by way of an address on address bus 18, and is capable of storing write-in data and retrieving corresponding read-out data on data bus 20. Device 10 is selected for a read operation for retrieving read-out data by a positive logic signal on read/write(R/W) line 22. Conversely, device 10 is selected for a write operation by applying a low logic level or potential on line 22. Device 10 may include a negative logic or active low chip select ($\overline{CS}$) line 24. When line 24 is high, device 10 is disabled.

Before proceeding to a detailed description of the preferred embodiment referenced to the drawings, a general overview of the protection established by device 10 will be set forth. An important feature of the present invention is to provide a memory device that generates read-out data onto an external data bus that does not conform with, or, in other words, is the not the same as, the corresponding write-in data. The read-out data is thus inconsistent with the write-in data. This modification is performed in a predetermined way so that the read-out data may be suitably processed by transfer software in order to obtain the original data. The following terms will apply to the description below. Incoming data to device 10 will be referred to as write-in data, while data being retrieved from device 10 will be referred to as read-out data. Further, data being applied to and stored in RAM core 12 will be referred to as core input data or simply input data, while the data being retrieved from RAM core 12 and output therefrom will be referred to as core output data or simply output data.

With the foregoing in mind, one of three general situations will apply, corresponding to each of the three disclosed embodiments of the present invention. In a first embodiment, shown in FIG. 1, the write-in data is transferred according to a predetermined write-transfer, and is stored in RAM core 12. The core output data from RAM core 12 is further transferred according to a first predetermined read-transfer function to generate the device read-out data. To realize the computer data protection function in accordance with the objects of the present invention, the first predetermined write-transfer and read-transfer functions are not complementary or the inverse of each other, but, rather, modify the data in a predetermined fashion such that the write-in and read-out data are not the same (i.e., do not conform). Suitably configured transfer software (i.e., that performs a function which is complementary to the composite of the applied write-transfer and read-transfer functions) is then used and applied to the read-out data to obtain the original data for use during program execution.

Figure 2:
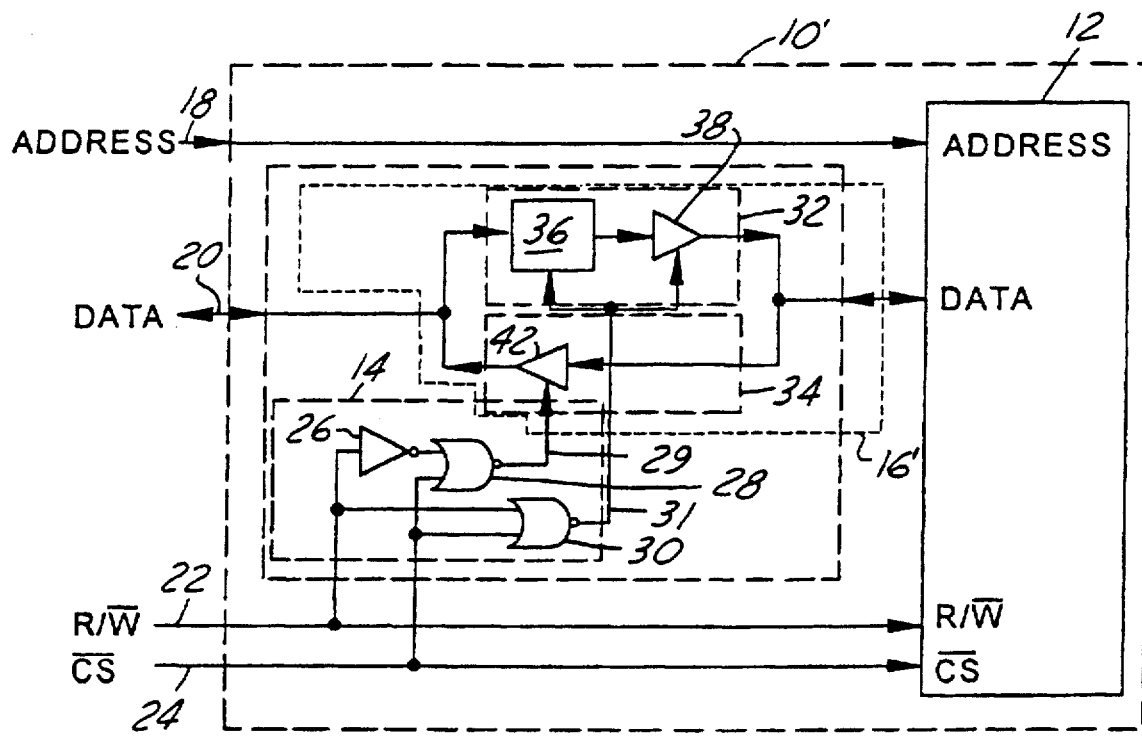
FIG. 2 is a simplified schematic and block diagram view illustrating a second embodiment in accordance with the present invention.

In a second situation, corresponding to the second embodiment shown in FIG. 2, the write-in data is transferred according to a predetermined write-transfer, and is applied as core input data and stored in RAM core 12. When RAM core 12 is accessed to generate the corresponding core output data, such core output data is merely buffered and applied to the external data bus as the read-out data. Since no corresponding read-transfer function has been applied to the data from core 12, the read-out data does not conform to the write-in data. In this situation, suitable transfer software (i.e., that performs a function which is complementary to the applied write-transfer function) is used to obtain the original data.

Figure 3:
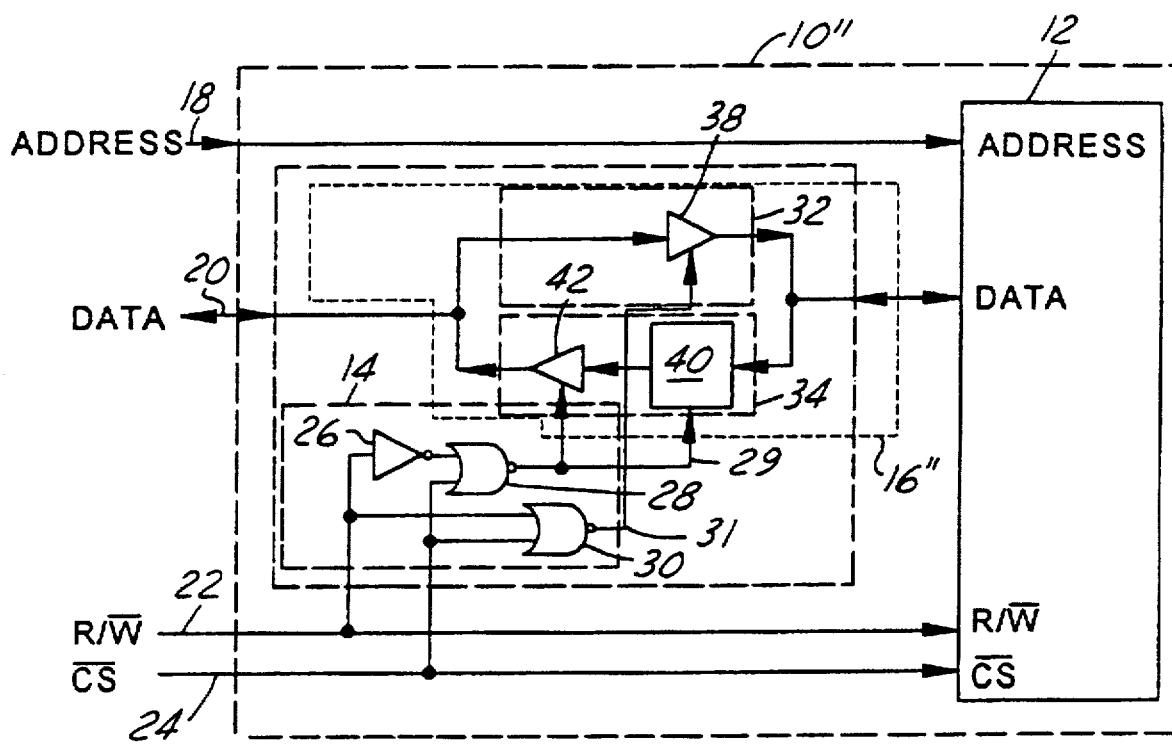
FIG. 3 is a simplified schematic and block diagram view illustrating a third embodiment in accordance with the present invention.

In a third situation, corresponding to the third embodiment shown in FIG. 3, write-in data is buffered, and applied to RAM core 12 as core input data, and stored therein in accordance with the R/W signal. When RAM core 12 is accessed to generate the corresponding core output data, such core output data is transferred by a predetermined read-transfer function and is provided as the read-out data of device 10. Since the read-transfer function is applied to data to which no write-transfer function has been applied, the read-out data does not conform to the corresponding write-in data. Suitable transfer software (i.e., that performs a function which is complementary to the applied read-transfer function) is applied to the read-out data to obtain the original data.

Proceeding now to a detailed description, RAM core 12 includes an input and output and is provided for storing core input data (during a write operation) on the input according to the R/W signal, and further for outputting core output data (during a read operation) on the output according to the R/W signal. The core output data conforms, or is the same as, the corresponding core input data. FIG. 1 shows the input and output portions of RAM core 12 as a bi-directional single line to a port entitled DATA. It should be understood by those of ordinary skill in the art that the data bus of RAM core 12 may take on the character of an input bus, and output bus, or, a bus having no defined meaning, depending upon the state of R/W, and CS, as is conventional in the art. RAM core 12 may be an independent integrated circuit; preferably, however, RAM core 12 is fabricated onto one integrated circuit with control logic circuit 14, and transfer circuit 16. In this way, an object of providing protection for computer data is enhanced, since intermediate data signals are difficult to intercept.

Control logic circuit 14 is responsive to the R/W, and chip select CS signal for generating a read path enable signal, and a write path enable signal for controlling operation of transfer circuit 16. In particular, control circuit 14 includes NOT gate 26, NOR gate 28 generating a read path enable signal 29, and NOR gate 30 generating a write path enable signal 31. In operation, when data is to be written on data bus 20, a low potential is maintained on the R/W, and CS lines. It should be apparent that such a combination causes write path enable signal 31 to be maintained at a high potential, while read path enable 29 is maintained at a low potential. Conversely, when data is to be read out of device 10 onto data bus 20, write path enable signal 31 is at a low potential, or, in other words, a logic low level, while read path enable signal 29 is at a high potential, or, in other words, a logic high level. The full import of signals 29, 31 will be explained in greater detail below.

Transfer circuit 16 is responsive to write-in data on data bus 20 for generating core input data to RAM core 12, and is further responsive to core output data from RAM core 12 for generating read-out data on data bus 20. Transfer circuit 16 includes a write path 32, a read path 34, a write-transfer device 36, a tri-state buffer 38, a read-transfer device 40, and a tri-state buffer 42. Transfer circuit 16 provides the means (particularly write-transfer device 36, and read-transfer device 40) for causing nonconformance between write-in data and read-out data.

Write path 32 is controlled by write path enable signal 31 for selectively transferring write-in data using write-transfer device 36, and for controlling or buffering data flow by way of tri-state buffer 38.

Read path 34 is controlled by read path enable signal 29 for selectively transferring core output data from RAM core 12 using read-transfer device 40, and for controlling or buffering data flow onto external data bus 20 by way of tri-state buffer 42.

Write-transfer device 36 is provided for selectively modifying write-in data to generate core input data to RAM core 12. Device 36 may be comprised of a logic circuit, a programmable logic array (PLA), a RAM device or a read only memory (ROM) device. The particular write-transfer algorithm employed (i.e., write-transfer function performed) by write-transfer device 36 may be one of a plurality of those known to those skilled in the art. For example, the write-transfer function may be implemented using a shuffling technique, wherein a pair of bits on the data bus (e.g., bit [6] and bit [7]) are "shuffled" (i.e., their positions are switched).

Read-transfer device 40 represents the means for selectively modifying core output data from RAM core 12 to generate read-out data of device 10. The structure used to construct read-transfer device 40 may be comprised of a logic circuit, a PLA, a RAM device or a ROM device. The particular read-transfer algorithm (i.e., read-transfer function performed) employed in device 40 may be any one of those known to one of ordinary skill in the art. For example, the read-transfer function may be implemented using the above-described "shuffling" technique.

Preferably, if both devices 36, and 40 are used in the same embodiment, the write-transfer algorithm used in device 36, and the read-transfer algorithm used in device 40 should be selected so as not to complement each other (or, in other words, not be the inverse functions of the each other, but rather, be selected to provide differing write-transfer/read-transfer functions so that the read-out data does not conform to the corresponding write-in data). In this way, a suitably selected software write-transfer/read-transfer program may be used in conjunction with device 10 to restore the data to its original form for use during computer operation.

Tri-states buffers 38, and 42 define an output control circuit for controlling read-in data flow and write-out data flow of device 10 in accordance with signals 29, 31.

FIG. 2 shows a second embodiment in accordance with the present invention, device 10'. Device 10' is identical to device 10, except that read-transfer device 40 has been deleted from the read path 34. In this way, read-out data on data bus 20 does not conform to the corresponding write-in data, thus achieving the data protection of objective of the present invention.

FIG. 3 shows a third embodiment in accordance with the present invention, device 10". Device 10" is identical to device 10, except that write-transfer device 36 has been deleted from the circuit configuration. In this way, only the read-out path 34 modifies data, wherein the read-out data does not conform to the corresponding write-in data, thus achieving the data protection objective of the present invention.

Thus, in FIG. 2, the write-in data is sent directly into RAM core 12. During the read-out data phase, a read-transfer function or algorithm process, as carried out by device 40, is performed. In contrast, as shown in FIG. 3, a write-transfer function or algorithm, as carried out by device 36, is performed on the write-in data. A corresponding read-transfer process is not performed during the read-out phase. Therefore, under the condition of partial processing of data (i.e., only performance of one of write-transfer function or read-transfer function), as shown in FIGS. 2 and 3, to restore the read-out data into its original form, the read-out data appearing on the external data bus 20 must be processed to compensate for the write-transfer function or read-transfer function that was performed. This processing can be done by an appropriate software program (as described above in connection with the respective embodiment). A RAM device 10 in accordance with the present invention can thus be used in connection with read-transfer/write-transfer software. Through the employment of matching software and hardware, the data protection process can be greatly improved. For example, transfer software may be applied to data at a remote site and then transferred to a local site and stored in a memory device (such as device 10") having a read-transfer function. When the data is retrieved from device 10", it undergoes the read-transfer function, and correct/valid data is obtained. If a conventional memory is used instead, incorrect/invalid data will be obtained since no corresponding read-transfer algorithm has been applied to the data. Further, since the software performing the complementary transfer function is at a remote location, reverse engineering of that software is unavailable to the user at the local site. Reverse engineering of the device 10" is difficult, since it is in hardware. Further, it should be appreciated that alternative variations of the above scenario are also possible.

Thus, write-transfer device 36, and read-transfer device 40, in the embodiments of FIGS. 2 and 3, respectively, provide the means for modifying one of the write-in data, and the core output data according to the write path enable signal 31 and the read path enable signal 29 to achieve nonconformance between the read-out data and the corresponding write-in data. It should be appreciated that the embodiment shown in FIG. 1 is the most general, while the embodiments in FIGS. 2 and 3 provide for an economical implementation.

A method of operating a memory device having a read path and a write path to achieve nonconformance between read-out and corresponding write-in data may be provided as follows: first, selecting one of the read path 34, and write path 32 for data modification. The path selection step defines or controls whether a write-transfer device is needed, as in FIG. 2, or whether a read-transfer device is needed as in FIG. 3. Next, a second step involves storing write-in data through the write path 32 modified according to the selection made previously regarding the read path or the write path. Therefore, if the write path were selected for data modification, storage of write-in data through the write path would occur such that a write-transfer device 36 would modify the data. If the read path were selected for data modification, however, write-in data stored through the write path would flow through unmodified. Finally, the last step includes retrieving read-out data through the read path modified according to the previously made selection regarding the read path or the write path for data modification. Thus, if the read path were selected for data modification, retrieval of the read-out data would occur through the read path through read-transfer device 40 such that the core output data of RAM core 12 would be modified. In summary, nonconformance between the write-in data and the corresponding read-out data is established by a device in accordance with the present invention.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only the appended claims. For example, both write-transfer device 36, and read-transfer device 40, may actually be fabricated in device 10' and 10", and, by the addition of another control line, a selected one of devices 36, and 40 may be effectively taken out of the circuit. For example, when the present invention is used in a multi-RAM configuration, an output enable ($\overline{OE}$) signal may be used in the control circuit.

I claim:

1. A memory device for storing write-in data a retrieving corresponding read-out wherein said read-out data does not conform to said write-in data, comprising:

a control circuit, responsive to a read signal and a write signal, for generating at least one enable signal;

a memory means, having an input and an output, for storing input data on said input according to said write signal and for outputting output data on said output according to said read signal, said output data conforming to said input data; and a transfer circuit, responsive to said write-in data and output data of said memory means, for respectively generating said input data and said read-out data, said transfer circuit being further responsive to said enable signal for causing nonconformance between said write-in data and said read-out data.

2. The memory device of claim 1 wherein said memory means and transfer circuit are fabricated onto one integrated circuit.

3. The memory device of claim 1 wherein said control circuit is further responsive to a chip select signal for generating said enable signal.

4. The memory device of claim 1 wherein said transfer circuit comprises a structure selected from the group consisting of a logic circuit, a programmable logic array (PLA), a random access memory (RAM), and a read only memory (ROM).

5. The memory device of claim 1 wherein said transfer circuit includes write-transfer means for selectively modifying said write-in data to read-transfer means data, and read-transfer means for selectively modifying said output data to generate said read-out data, said write-transfer means defining a write path, said read-transfer means defining a read path.

6. The memory device of claim 1 wherein said transfer circuit includes an output control circuit for controlling read-in data flow and write-out data flow.

7. The memory device of claim 6 wherein said output control circuit includes at least one tri-state buffer.

8. A memory device for storing write-in data through a write path and for retrieving corresponding read-out data through a read path wherein said read-out data does not conform to said corresponding write-in data, comprising:

- a control circuit, responsive to a read signal, a write signal, and a chip select signal, for generating a read path enable signal and a write path enable signal;
- a memory means, having an input and an output, for storing input data on said input according to said write signal and for outputting output data on said output according to said read signal, said output data conforming to said corresponding input data; and
- a transfer circuit, responsive to said write-in data and output data of said memory means, for generating said input data according to said write path enable signal and said read-out data according to said path enable signal, respectively,
- said transfer circuit further including means for modifying one of said write-in data and said output data according to said write path enable signal and said read path enable signal to achieve nonconformance between said read-out data and said write-in data.

9. The memory device of claim 8 wherein said memory means and transfer circuit are fabricated onto one integrated circuit.

10. The memory device of claim 8 wherein said transfer circuit comprises a structure selected from the group consisting of a logic circuit, a programmable logic array (PLA), a random access memory (RAM), and a read only memory (ROM).

11. The memory device of claim 8 wherein said transfer circuit includes an output control circuit for controlling read-in data flow and write-out data flow.

12. The memory device of claim 11 wherein said output control circuit includes at least one tri-state buffer.

13. A method of operating a memory device of the type having a read path and a write path such that read-out data does not conform to write-in data, comprising the steps of:

(A) selecting one of the read path and write path for data modification, wherein said read path and said write path each comprise a transfer logic circuit coupled to said memory device and said selecting comprises directing an enable signal to the transfer logic circuit to be selected;

(B) storing write-in data in said memory device through the write path modified if appropriate according to the selection made in step (A); and (C) retrieving read-out data from said memory device through the read path modified if appropriate according to the selection made in step (A), whereby nonconformance between the write-in data and read-out data is established in response to and by controlling said enable signal.

14. The method of claim 13 wherein said logic circuits comprise at least one tri-state buffer.

* * * * *